(12) United States Patent
Byma et al.

(10) Patent No.: US 6,951,264 B2
(45) Date of Patent: Oct. 4, 2005

(54) ACOUSTICALLY ATTENUATING HEADLINER AND METHOD FOR MAKING SAME

(75) Inventors: George B. Byma, Clarkston, MI (US); Bari W. Brown, Ann Arbor, MI (US); John Tiesler, Harrison Twp., MI (US)

(73) Assignee: Lear Corporation, Southfield, MI (US)

( * ) Notice: Subject to any disclaimer, the term of this patent is extended or adjusted under 35 U.S.C. 154(b) by 242 days.

(21) Appl. No.: 10/378,701

(22) Filed: Mar. 4, 2003

(65) Prior Publication Data

US 2004/0174049 A1 Sep. 9, 2004

(51) Int. Cl.⁷ .............................. E04B 1/82; B32B 1/04
(52) U.S. Cl. ........................ 181/286; 181/290; 296/214
(58) Field of Search .................. 296/214; 181/284, 181/286, 290, 291, 292, 293, 294, 295; 428/72, 73

(56) References Cited

U.S. PATENT DOCUMENTS

| | | | |
|---|---|---|---|
| 4,886,696 A | 12/1989 | Bainbridge | 428/184 |
| 5,022,943 A | 6/1991 | Zaima | 156/222 |
| 5,134,014 A | 7/1992 | Zaima et al. | 428/186 |
| 5,660,908 A | * 8/1997 | Kelman et al. | 428/74 |
| 5,892,187 A | 4/1999 | Patrick | 181/286 |
| 6,033,756 A | 3/2000 | Handscomb | 428/138 |
| 6,204,209 B1 | 3/2001 | Rozek et al. | 442/374 |
| 6,290,022 B1 | 9/2001 | Wolf et al. | 181/292 |
| 6,364,976 B2 | 4/2002 | Fletemier et al. | 156/62.2 |
| 6,379,595 B1 | 4/2002 | Byma et al. | 264/113 |
| 6,413,613 B1 | 7/2002 | Byma | 428/116 |
| 6,451,233 B1 | 9/2002 | Byma et al. | 264/46.4 |
| 2001/0000162 A1 | 4/2001 | Fletemier et al. | 442/35 |
| 2002/0125740 A1 | 9/2002 | Wieschermann et al. | 296/210 |

* cited by examiner

Primary Examiner—Joseph D. Pape
(74) Attorney, Agent, or Firm—Bliss McGlynn, P.C.; Bill Panagos

(57) ABSTRACT

The present invention is directed toward providing a headliner for a motor vehicle comprising an interior layer adapted to present a surface that is exposed to the interior of the vehicle, a flexible film assembly that is supported by the interior layer opposite to the interior of the vehicle; and a fill layer adapted to be flowed over the flexible film and subsequently hardened to form a main supporting body of the headliner. The flexible film assembly has a first film layer adapted to establish a generally flat base surface that is mounted to the interior layer and a second film layer supported on the first film layer having a plurality of voids formed by portions of the second film layer that are spaced from said first film layer at predetermined intervals so as to establish an undulating upper surface of the film assembly. The plurality of voids are adapted to act as a plurality of resonating cavities to attenuate acoustical frequencies within the vehicle.

12 Claims, 3 Drawing Sheets

ACOUSTICALLY ATTENUATING HEADLINER AND METHOD FOR MAKING SAME

BACKGROUND OF THE INVENTION

1. Field of the Invention

The present invention relates, generally, to a headliner for use within a passenger compartment of a motor vehicle and, more specifically, to a headliner having acoustically attenuating properties.

2. Description of the Related Art

Headliners for motor vehicles are well known and generally comprise multi-layer panel type assemblies that are mounted inside the passenger compartment and against the roof of the vehicle to provide an aesthetic covering for the sheet metal and roof support structure. Conventionally, headliners expose a fabric or smooth finished layer, which is built up on a fibrous or foam material, to the interior of the passenger compartment. This interior layer, also known in the art as a "Class A" type surface, is typically affixed to a backing layer of a relatively strong, reinforced paper or plastic material, which is fastened to the inside of the roof of the vehicle. The backing layer may also be a composite layer that includes a type of bulk material to provide some level of sound deadening.

Due to economic factors, vehicle and headliner manufacturers are constantly under pressure to reduce headliner weight. Lighter weight headliners can lower the cost of manufacturing by reducing the amount of materials used in headliner, and generally lower the operating expense of the vehicle by contributing toward improving the gas mileage. On the other hand, the benefits of lighter weight headliners must be balanced with a competing issue of strength. A stronger headliner makes it easier for accessories such as dome lights, visors, mirrors and the like, to be installed directly to the headliner.

In addition to the economic issues mentioned above, the driving public places considerable importance on vehicle noise reduction. Since a large part of a vehicle's interior surface is covered by the headliner, efforts in noise reduction and sound control are strongly focused there. Previous manufacturers' attempts in noise reduction, as applied to headliner design, have generally forced a trade-off between desired weight reduction and the addition of heavy bulk materials that deaden or reduce the sound waves that pass through them.

To avoid the drawback of increased headliner weight by the addition of bulk material for sound absorption, some recent headliner designs have included resonating cavities formed in the upper layers. The resonating cavities create open areas that absorb sound while reducing the weight of the headliner. Properly designed resonating cavities can absorb and attenuate sound frequencies that reach them from any direction. In this way, undesirable external sound frequencies are absorbed as they enter the passenger compartment through the roof area, as well as those from other sources that are ambient in the vehicle interior. The physical nature of a resonating cavity is also such that it may be tuned by its particular size to resonate at, and thereby absorb, specific frequency ranges. Certain headliner designs have even incorporated a very efficient and frequency specific type of resonating cavity known as a Helmholtz resonator.

The typical approach to introducing resonating cavities into a headliner structure requires the insertion of additional layers or sheets of thin but rigid material into the middle layers of the headliner. These sheets are preformed to provide some type of undulating surface that creates the cavities on one side while other bulk material is packed or otherwise compressed about the other side as the headliner is formed. These special rigid sheets must be specifically manufactured to relatively close tolerances and then must be cut and sized to fit within the mold that produces the headliner. While the addition of the rigid sheets helps provide some inherent strength, they add to the cost of the headliner, both in materials and construction expense. Additionally, the bulk material that is cooperatively used with the rigid sheets is generally a loose fibrous material that may be packed and compressed against the undulations of the rigid sheets. The nature of the loose bulk material provides no physical strength itself and adds to the manufacturing complexity of the headliner as it must be held in its compressed state against the rigid sheet by another securing layer over top.

Thus, while the introduction of resonating cavities within the headliner has helped overcome some of the previous trade-offs between good sound absorbing qualities verses bulk headliner weight, current manufacturing techniques and the materials used in the construction of headliners having resonating cavities remain relatively costly. Therefore, there remains a need in the art for a lightweight, yet strong, headliner having easily formed resonating cavities that can be inexpensively assembled.

SUMMARY OF THE INVENTION

The disadvantages of the related art are overcome by the present invention that provides a headliner for a motor vehicle comprising an interior layer adapted to present a surface that is exposed to the interior of the vehicle, a flexible film assembly that is supported by the interior layer opposite to the interior of the vehicle and a fill layer adapted to be flowed over the flexible film and subsequently hardened to form a main supporting body of the headliner. The headliner of the present invention is adapted to be juxtaposed to the roof of the vehicle. The flexible film assembly has a first film layer adapted to establish a generally flat base surface that is mounted to the interior layer and a second film layer supported on the first film layer having a plurality of voids formed by portions of the second film layer that are spaced from the first film layer at predetermined intervals so as to establish an undulating upper surface of the film assembly. The plurality of voids are adapted to act as a plurality of resonating cavities to attenuate acoustical frequencies within the vehicle. In this manner, the present invention provides a lightweight, yet strong and rigid headliner that has resonating cavities for sound absorption and attenuation that is easily and inexpensively constructed using a flowable fill layer that hardens over a flexible film assembly.

The present invention further overcomes the drawbacks of the prior art by providing a method of constructing an acoustically attenuating headliner for a motor vehicle. The method includes the steps of placing an interior headliner layer onto a first tool surface of a headliner mold and placing a flexible film assembly having a first film layer that defines a flat base surface and a second film layer that defines an undulating upper surface into the headliner mold such that the first film layer is in contact with the interior layer. The method steps further include closing the headliner mold, introducing a flowing viscous fill layer over the second film layer of the flexible film assembly, and allowing the fill layer to harden in the enclosed mold over the undulating surface of the flexible film to form a headliner having a plurality of pockets for acoustical attenuation. Finally, the method steps include opening the mold and removing the headliner. In this manner, the present invention also provides a method of constructing a lightweight, yet strong and rigid, acoustically attenuating headliner that has resonating cavities for sound absorption and attenuation that is easily and inexpensively constructed using a flowable fill layer that hardens over a flexible film assembly.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
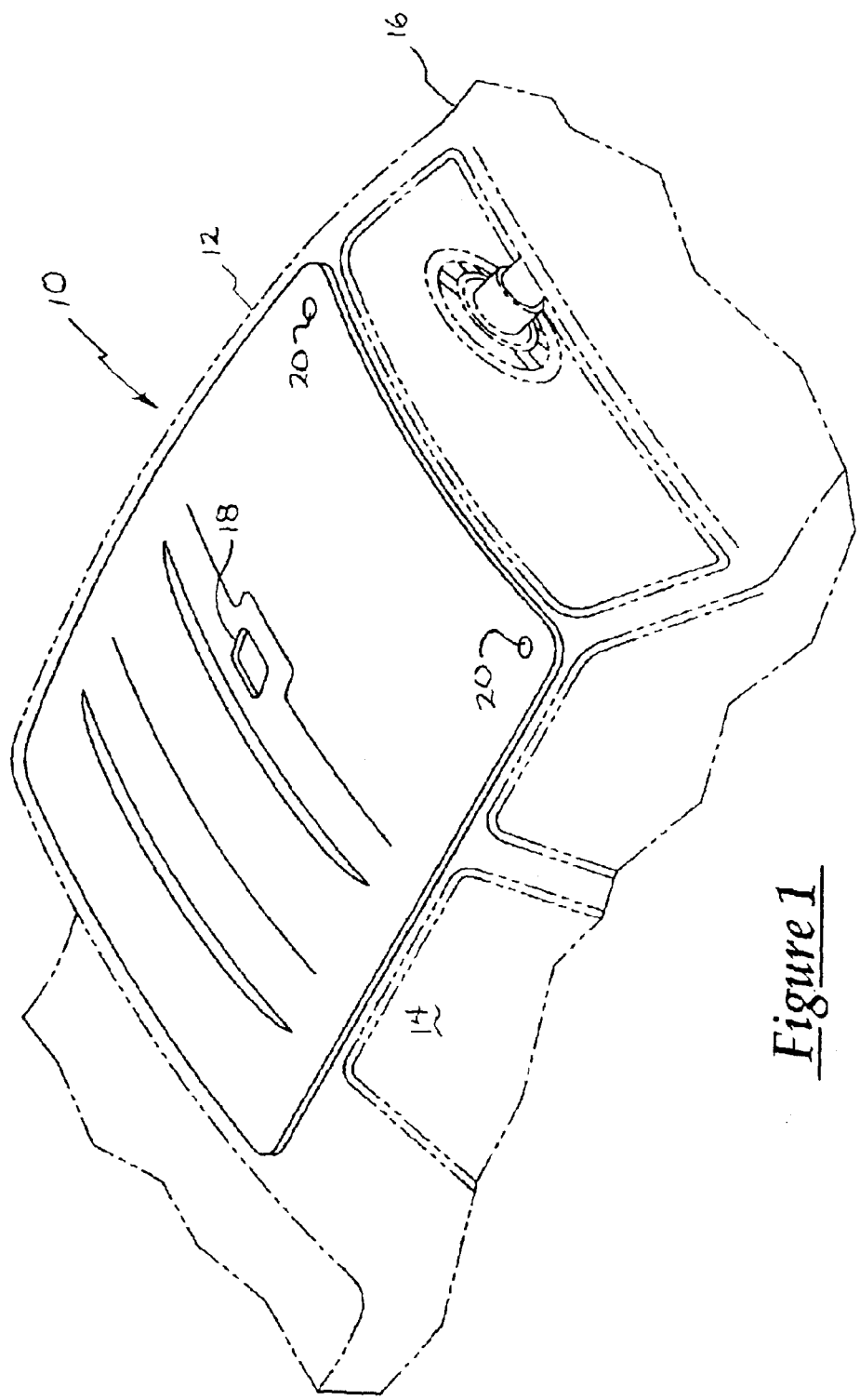
FIG. 1 is a partial perspective view showing the headliner of the present invention installed in a motor vehicle.
Figure 2A:
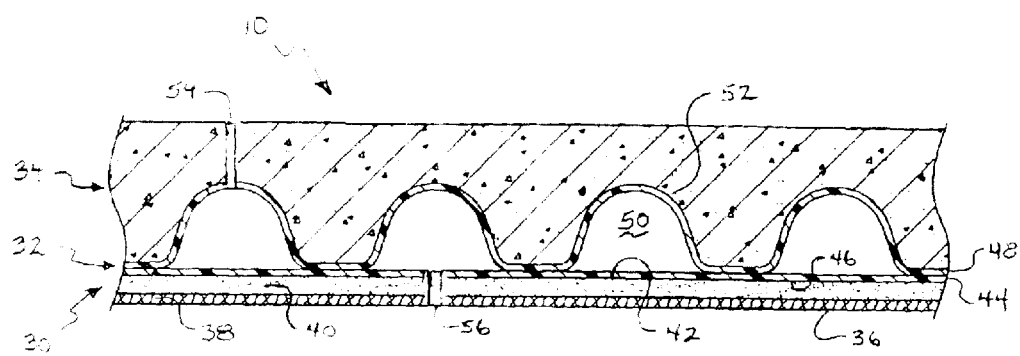
FIG. 2A is a cross-sectional side view of one embodiment of the headliner of the present invention having resonating cavities.
Figure 2B:
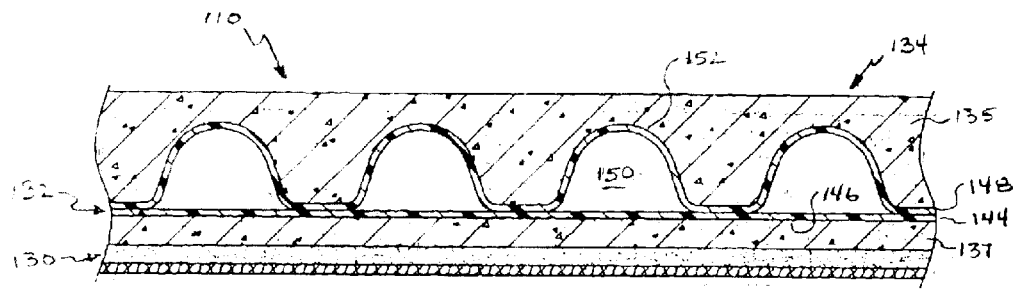
FIG. 2B is a cross-sectional side view of another embodiment of the headliner of the present invention having resonating cavities with an additional fill layer.
Figure 2C:
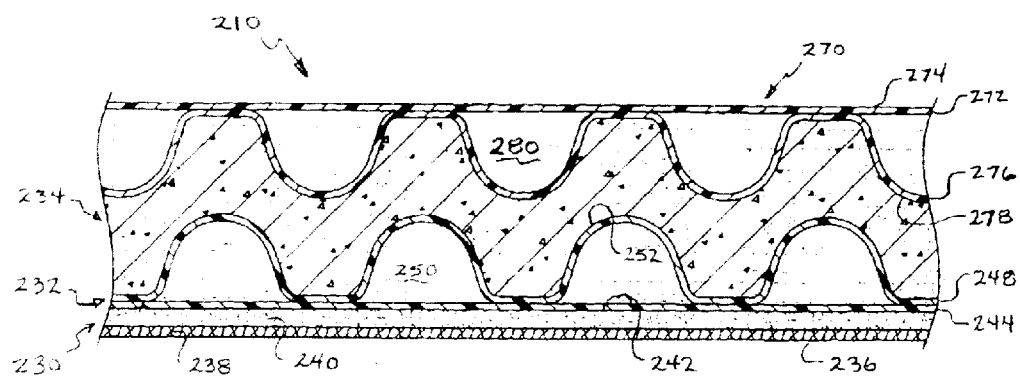
FIG. 2C is a cross-sectional side view of another embodiment of the headliner of the present invention having two sets of opposing but offset resonating cavities.
Figure 2D:
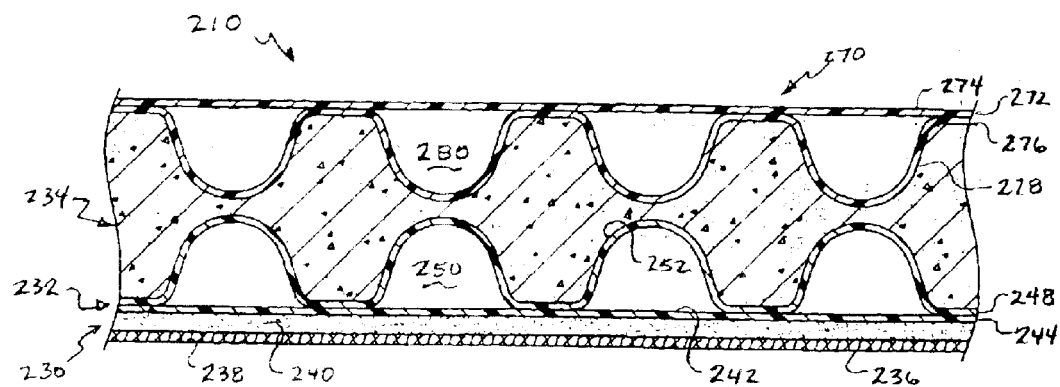
FIG. 2D is a cross-sectional side view of another embodiment of the headliner of the present invention having two sets of opposing and aligned resonating cavities.

The headliner of the present invention is generally indicated at 10, 110, and 210 in FIGS. 1–2D where like numerals, some of which have been increased by 100 or 200, are used to designate like structure throughout the Figures. Referring specifically to FIG. 1, the headliner 10 is mounted to the underside of a roof 12 within the interior 14 of a motor vehicle 16 by any of a variety of known methods. The headliner 10 may include an opening 18 for a dome light (not shown) and openings 20 for receiving the mounting hardware for a pair of sun visors (not shown). Depending on the application, the headliner 10 may include various other openings as necessary. Alternatively, it may be desirable to pre-install such components as dome lights, sun visors, coat hooks, wire harnesses and the like on the headliner 10 prior to mounting the headliner in the vehicle 16.

As shown in cross-section in FIG. 2A, the headliner 10 includes a laminate or composite construction including an interior layer generally indicated at 30, a flexible film assembly generally indicated at 32 and a fill layer generally indicated at 34. The interior layer 30 is adapted to present a finished or "class A" surface 36 that is exposed to the interior 14 of the vehicle 16. The interior layer 30 has a composite structure having a cover member 38, a pad, or reinforcing member 40, and a top surface 42. Those having ordinary skill in the art will appreciate that the cover member 38 may be made of fabric or cloth material that presents the finished surface 36 and is affixed to the pad member 40. The pad member 40 is generally a thin foam layer that supports the cover member 38 and provides a soft underlayment to protect the cover member 38 from damage. However, it should be further appreciated that the cover member 38 may be made of a bondable material or fibers that are fused or affixed to the pad member 40. Likewise, the interior layer 30 may be formed from a homogenous curable material that forms a skin as a finished surface 36 with the remainder of the curable material forming a pad layer. Regardless, the physical structure of the interior layer 30 may be of any known type that provides a finished surface 36 and a top surface 42.

A flexible film assembly 32 is supported by the interior layer 30 opposite to the interior 14 of the vehicle 16. The flexible film assembly 32 has a first film layer 44, which is adapted to establish a generally flat base surface 46 that is mounted to the top surface 42 of interior layer 30. The flexible film assembly 32 also has a second film layer 48 that is supported on the first film layer 44. The second film layer 48 has a plurality of voids 50 formed by portions of the second film layer that are spaced from the first film layer 44 at predetermined intervals so as to establish an undulating upper surface 52 of the film assembly 32. It should be appreciated that the flexible film assembly 32 may be a pre-assembled component that may be constructed of any of a number of flexible film materials. The construction of the flexible film assembly is not germane to this application as long as the film assembly 32 is produced to create the undulating surface 52 of the second film layer 48 to thereby provide the plurality of voids 50 as described herein. For example, the voids 50 may be created by encapsulating air, or a specific gas at atmospheric, or higher pressure as the second film layer 48 is affixed to the first film layer 44. Likewise, the undulations of second film layer 48 may be otherwise created before attaching it to the first film layer 44 to create the desired plurality of voids 50.

A fill layer 34 is flowed over the undulating upper surface 52 of the second film layer 48 and subsequently hardened to form a main supporting body of the headliner 10 that is adapted to be juxtaposed to the roof of the vehicle 16. In this manner, the plurality of voids 50 in the flexible film assembly 32 allow the fill layer 34 to harden in a complimentary shape thereby creating cavities within the hardened fill layer 34 that will responsively resonate to certain frequencies of sound waves that pass through them thereby providing attenuation of those sound waves as will be explained in greater detail below. Therefore, it should be appreciated that while the specific materials of the flexible film assembly 32 may be of any of a variety of materials, the resultant flexible film assembly 32 must be able to sustain the plurality of voids 50 and not collapse when the fill layer 34 is flowed over the undulating surface 52. Furthermore, the flexible film assembly 32 should have the relative suppleness to easily conform to the surface contours of the top surface 42 of the interior layer as the film assembly is disposed against the interior layer 30 during the construction of the headliner 10.

To form the main supporting body of the headliner 10, the fill layer 34 of the headliner 10 of the present invention may be one of any of a variety of known lightweight materials that is initially in a viscous state when flowed over the second film layer 48 of the flexible film assembly 32 and subsequently cured to a hardened state, either by external influences or by its inherent nature. By way of non-limiting example, the fill layer 34 may be a thermal set material made from at least one of a group comprising polyurethane or polystyrene compounds. Alternatively, the fill layer 34 may also be a multi-part, catalyst accelerated, curable material made from at least one of a group comprising epoxy compounds.

It should be appreciated that different materials can vary acoustically from being highly reflective of sound waves to being acoustically transparent. The ability of a material to either block or pass sound waves can also vary depending on the frequency range of the particular sound waves. Thus, the materials of the headliner of the present invention may be chosen based on this inherent physical property with a view toward the particular application. In other words, the choice of the material composition of the interior layer 30 and the fill layer 34 may be driven by how the headliner is to be employed. If it is desirous to attenuate sound waves that are in the passenger compartment, then the interior layer 30 may be chosen from materials that are relatively transparent to the range of frequency of the sound wave in question, so that they may readily pass into the resonate cavities. On the other hand, the material of the fill layer 34 may be chosen to block the frequency range of those particular sound waves thereby trapping them in the resonating cavities and preventing the same frequency range of sound waves from entering through the vehicle roof. In the same manner, the choice of the material comprising the flexible film layer 32 should be relatively transparent to the frequency range of sound waves that are being attenuated to allow them to readily pass into the resonate cavities. It should be further appreciated that the resonating cavities may be opened to remove any acoustically reflective properties that the flexible film may have. This may be accomplished, for example, by heating the headliner 10 to a temperature sufficient to melt the flexible material some time after the fill layer 34 hardens such that the flexible film surrounding the voids 50 melts. In this way, the cavities become acoustically open to the fill layer 34 and the interior layer 30 as will be explained in greater detail below.

Alternatively, in one embodiment of the headliner of the present invention illustrated in FIG. 2A, an opening 54 may be created in the undulating surface 52 through the fill layer 34 and an opening 56 may be created in the base surface of the first film layer 44 through the interior layer. These openings 54, 56 alter the physical nature of the particular resonating cavity. The opened resonating cavity functions in accordance with the acoustically attenuating properties of a Helmholtz resonator. A Helmholtz resonator is an acoustical apparatus that provides very efficient and specific frequency attenuation. The actual cross-sectional size of the opening in relation to the other dimensions of the cavity mathematically influences which frequencies are resonated and attenuated within the cavity. Therefore, the particular shape and size of the opening will depend on the specific application and the desired range of frequency attenuation. The openings 54 or 56 may be produced during the assembly process or at a later time.

It should be appreciated that the Helmholtz effect in a resonator is operative in any direction. However, it is most efficient when the opening is oriented in the general direction of propagation of the sound wave to be attenuated. Therefore, opening 54 or another like opening through the upper portion of the headliner 10 is generally more effective in attenuating outside noises entering the vehicle. Opening 54 is generally more effective for attenuating sound and noises from within the vehicle. To create the openings 54, 56 the material may be physically cut by a fixed or moving blade. However, a micro-precision cut, especially in the case of opening 56, may be made by fine needle piercing, or by precision laser or water-pressure cutting. In this manner a very fine and accurate opening can be made through the interior layer 30 that is not readily visible. Thus, in this example of the headliner of the present invention, at least one of the plurality of resonating cavities is pierced by a piercing operation during the assembly process such that the pierced cavity further acts as a Helmholtz resonators for acoustical attenuation.

FIG. 2B illustrates another embodiment of the headliner of the present invention where like numerals, increased by 100 with respect to the embodiment illustrated in FIG. 2A are used to designate like structure. As shown, the headliner, generally indicated at 110, includes a film assembly 132 that is operatively supported at a predetermined distance from the interior layer 130 such that the fill layer 134 has a first portion 135 and a second portion 137. The first portion 135 of the fill layer 134 is adapted to be flowed over the undulating surface 152 of the second film layer 148, and the second portion 137 of the fill layer 134 is adapted to be flowed between the interior layer 130 and the first film layer 132. The first and second portions 135, 137 of the fill layer 134 subsequently harden to form a main supporting body of the headliner 110 thereby encapsulating the film assembly 132 between the first and the second portions 135, 137 of the fill layer 134. In this manner, the plurality of voids 150, and thereby the resonating cavities are closed off and function as panel-type closed body resonators that absorb the sound waves that pass through them. It should be appreciated that panel-type resonating cavities allow the sound waves to pass through the panel material, in this case the second portion 135 of the fill layer 134, and resonate in the cavity, thereby attenuating them.

FIG. 2C illustrates another embodiment of the headliner of the present invention where like numerals, increased by 200 with respect to the embodiment illustrated in FIG. 2A are used to designate like structure. As shown, the headliner, generally indicated at 210, employs a second film assembly generally indicated at 270. The second film assembly 270 has a first film layer 272 defining a flat base surface 274 and a second film layer 276 defining an undulating surface 278 and a plurality of voids 280. The undulating surface 278 of the second film assembly 270 is disposed in a spaced relationship with respect to the undulating upper surface 252 of the first film assembly 232 such that the fill layer 234 is adapted to be flowed between the opposed undulating surfaces 252, 278 of the first and second film assemblies 232, 270. Like the other embodiments, the fill layer 234 is subsequently hardened to form a main supporting body of the headliner 210 having two opposing sets of resonating cavities. It should be appreciated that this embodiment of the headliner of the present invention provides additional resonating cavities that have acoustical attenuating properties. FIG. 2C also illustrates a headliner of the present invention where the opposed undulating surfaces 252 and 278 of the first and said second film assemblies 234 and 270 are offset such that the opposed resonating cavities are in a likewise offset relationship. FIG. 2D illustrates another embodiment of the headliner having the same components as the example of FIG. 2C but with the opposed undulating surfaces of the first and the second film assemblies 234 and 270 aligned such that said resonating cavities are likewise in an aligned relationship.

Figure 3A:
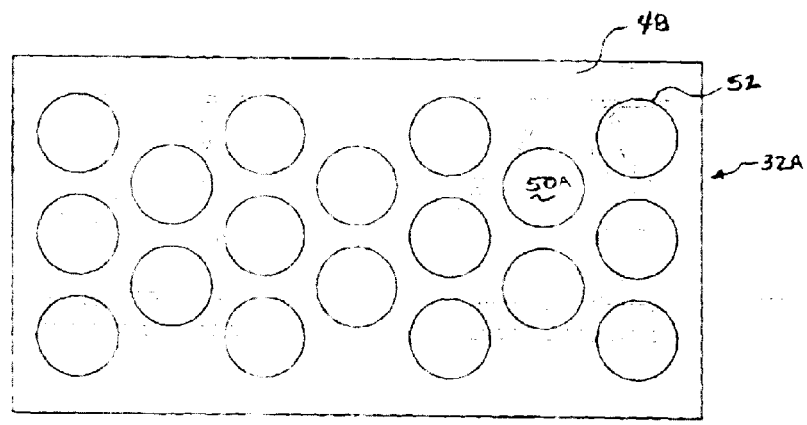
FIG. 3A is a top view of a film assembly of the headliner of the present invention with a second film layer having uniform undulations defining uniform voids.

Referring to FIG. 3A, one example of the film assembly that may be employed in the present invention is shown in top view as 32A. In this example, the undulating surface 52 of the second film layer 48 of the flexible film assembly 32A has a plurality of uniform undulations defining a plurality of voids 50A having uniform size and volume, which will thus create a plurality of uniform resonating cavities. In this manner, the headliner 10 is tuned to a specific resonate frequency range that relates the size of the voids 50A and the resultant resonating cavities. It should be appreciated that the spacing of the voids 50A is dependant on the application as a closer spacing reduces the material of the fill layer 34 and may influence the overall strength of the headliner 10.

Figure 3B:
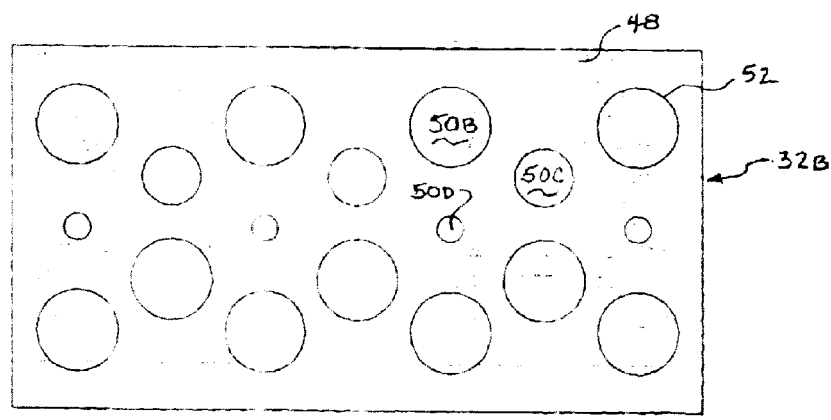
FIG. 3B is a top view of a film assembly of the headliner of the present invention with a second film layer having undulations of varying sizes defining voids having varying sizes.

Another non-limiting example of the flexible film assembly that maybe employed in the headliner of the present invention is illustrated in FIG. 3B. FIG. 3B is a top view of a flexible film assembly 32B that has a second film layer 48 having an undulating surface 52 that defines voids 50B, 50C, and 50D which have varying but predetermined sizes and volumes. The voids 50B, 50C, and 50D create a plurality of resonating cavities having varying size and volume when the headliner 10 is constructed. Thus, a headliner using the flexible film assembly 32B illustrated in FIG. 3B can be tuned to a wide range of resonate frequencies that relate to the various sizes of the voids 50B, 50C, and 50D and the resultant resonating cavities. It should be appreciated that the headliner of the present invention illustrated in FIGS. 2A, 2B, 2C, and 2D may employ either of the flexible film assemblies having voids of the type illustrated in FIGS. 3A and 3B. Thus, depending upon the application and the desired attenuation, the headliner of the present invention may employ flexible film assemblies that have either uniform voids or voids of varying sizes.

In accordance with the principles of the present invention, a method of constructing an acoustically attenuating headliner for a motor vehicle is provided. The method includes the steps of placing an interior headliner layer 30 onto a first tool surface of a headliner mold, then placing a flexible film assembly 32 having a first film layer 44 that defines a flat base surface 46 and a second film layer 48 that defines an undulating upper surface 52 into the headliner mold such that the first film layer 44 is in contact with the interior layer 30. Further, the method steps include closing the headliner mold, then introducing a flowing viscous fill layer 34 over the second film layer 48 of the flexible film assembly 32. The fill layer is allowed to harden in the enclosed mold over the undulating surface 52 of the flexible film 40 to form a headliner 10 having a plurality of pockets for acoustical attenuation. Finally, the mold is opened and the headliner 10 is removed.

The method of constructing the embodiment of an acoustically attenuating headliner of the present invention that is illustrated in FIG. 2B further includes the steps of placing the flexible film assembly 132 into the headliner mold so that the first film layer 144 is supported a predetermined distance above the interior headliner layer 30. Then, the headliner mold is closed and a flowing viscous fill layer 134 is introduced over the second film layer 148 of the flexible film assembly 132 and into the space between the first film layer 144 and the interior headliner layer 30. In this manner, a headliner as depicted in FIG. 2B having first and second portions 135 and 137 of the fill layer 134 is constructed.

The method of constructing an acoustically attenuating headliner of the present invention illustrated in FIG. 2C includes the step of placing a flexible film assembly 232 and a second flexible film assembly 270 into the acoustical headliner mold. The second flexible film assembly 270 has a first film layer 272 that defines a flat base surface 274 and a second film layer 276 that defines an undulating upper surface 278. The second film assembly 270 is placed in the mold so that the second film layer 276 is disposed in a spaced relationship with respect to the second film layer 248 of the first flexible film assembly 232. Then, the headliner mold is closed and a flowing viscous fill layer 234 is introduced between the second film layer 248 of the first flexible film assembly 232 and the second film layer 276 of the second film assembly 270 thereby causing the fill layer 234 to form a plurality of voids that define two opposing sets of voids 250, 280. In this manner, a headliner as depicted in FIG. 2C having opposing sets of resonate cavities is constructed.

The headliner of the present invention may also be constructed to include a plurality of Helmholtz type resonator cavities for acoustic attenuation by a method including the step of piercing the second film layer 48 of the film assembly 32 at each undulation of the second film layer 48 after the fill layer 34 has hardened. Alternatively, the method may include the step of heating the headliner to a sufficient temperature so as to cause the film layers 44 and 48 of the film assembly 32 to melt thereby allowing the plurality of voids formed in the fill layer 34 to act as open resonating cavities to attenuate acoustic frequencies. In one embodiment of the method of constructing an acoustically attenuating headliner, the fill layer 34 of the headliner 10 is allowed to harden in the mold. However, when the fill layer compound is of a thermal set type, the method further includes the step of causing the fill layer 34 to harden by heating the assembly in the mold.

In yet another embodiment of the method of constructing an acoustically attenuating headliner for a motor vehicle, the interior layer 30 is not placed in the mold with the other components of the headliner 10, but is affixed to the flexible film assembly after the molding process. The method includes the steps of placing a flexible film assembly 32 having a first film layer 44 as a flat base surface 46 and a second film layer 48 as an undulating upper surface 52 into a headliner mold. Then, the mold is closed and a viscous fill layer 34 is flowed over the second film layer 48 of the flexible film assembly 32. The fill layer 34 is allowed to harden over the undulating surface 52 of the flexible film 32 to form a plurality of voids for acoustical attenuation. The method includes the steps of opening the mold and removing the assembly and then affixing an interior headliner layer 30 onto the first film layer 44 of the film assembly 32 to complete the headliner 10.

In this way, the headliner of the present invention overcomes the deficiencies of headliners known in the related art that are designed for acoustical attenuation but are expensive to construct and are excessive in weight. The headliner of the present invention avoids the use of heavy bulk filler layers for sound attenuation and provides resonating cavities that are easily constructed by flowing a viscous fill layer over a light and flexible film layer. Furthermore, the advantages of the present invention are achieved in an efficient, cost effective and relatively simple manner.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A headliner for a motor vehicle comprising:
    an interior layer adapted to present a surface that is exposed to the interior of the vehicle;
    a flexible film assembly supported by said interior layer opposite to the interior of the vehicle; and a fill layer adapted to be flowed over said flexible film assembly and subsequently hardened to form a main supporting body of said headliner that is adapted to be juxtaposed to the roof of the vehicle, said flexible film assembly having a first film layer adapted to establish a generally flat base surface mounted to said interior layer and a second film layer supported on said first film layer having a plurality of voids formed by portions of said second film layer that are spaced from said first film layer at predetermined intervals so as to establish an undulating upper surface of said film assembly, said plurality of voids are adapted to act as a plurality of resonating cavities to attenuate acoustical frequencies within the vehicle.

2. A headliner as set forth in claim 1 wherein at least one of said plurality of resonating cavities is pierced by a piercing operation during the assembly process to produce a pieced cavity such that said pierced cavity further acts as a Helmholtz resonating cavity for acoustical attenuation.

3. A headliner as set forth in claim 1 wherein said second film layer has a plurality of uniform undulations defining said plurality of resonating cavities having uniform size and volume.

4. A headliner as set forth in claim 1 wherein said second film layer has a plurality undulations having varying but predetermined sizes and volumes defining said plurality of resonating cavities having a predetermined variety of sizes and volumes.

5. A headliner as set forth in claim 1 wherein said headliner further includes a second film assembly having a first film layer defining a flat base surface and a second film layer defining an undulating surface, said undulating surface of said second film assembly disposed in a spaced relationship with respect to said undulating upper surface of said first film assembly such that said fill layer is adapted to be flowed between said opposed undulating surfaces of said first and said second film assemblies and subsequently hardened to form a main supporting body of said headliner having two opposing sets of resonating cavities.

6. A headliner as set forth in claim 5 wherein said opposed undulating surfaces of said first and said second film assemblies are aligned such that said opposed resonating cavities are likewise in an aligned relationship.

7. A headliner as set forth in claim 5 wherein said opposed undulating surfaces of said first and said second film assemblies are offset such that said resonating cavities are likewise in an offset relationship.

8. A headliner as set forth in claim 1 wherein said first film layer of said film assembly is operatively supported a predetermined distance from said interior layer such that said fill layer has a first portion and a second portion, said first portion of said fill layer adapted to be flowed over said undulating surface of said second film layer and said second portion of said fill layer adapted to be flowed between said interior layer and said first film layer, said first and said second portions of said fill layer subsequently hardened to form a main supporting body of said headliner thereby encapsulating said film assembly between said first and said second portions of said fill layer.

9. A headliner as set forth in claim 8 wherein said second film layer has a plurality of uniform undulations defining said plurality of resonating cavities having uniform size and volume.

10. A headliner as set forth in claim 8 wherein said second film layer has a plurality undulations having varying but predetermined sizes and volumes defining said plurality of resonating cavities having a predetermined variety of sizes and volumes.

11. A headliner as set forth in claim 1 wherein said fill layer is a thermal set material made from at least one of a group comprising polyurethane or polystyrene compounds.

12. A headliner as set forth in claim 1 wherein said fill layer is a multi-part, catalyst accelerated, curable material made from at least one of a group comprising epoxy compounds.

* * * * *